United States Patent [19]

Drori

[11] Patent Number: 4,762,615

[45] Date of Patent: Aug. 9, 1988

[54] SEMI-AUTOMATIC FLUID FILTER

[76] Inventor: Mordeki Drori, 89 Zahal Street, Kiron, Israel

[21] Appl. No.: 71,328

[22] Filed: Jul. 9, 1987

[30] Foreign Application Priority Data

Aug. 15, 1986 [IL] Israel ..................................... 79723

[51] Int. Cl.⁴ ........................................... B01D 29/02
[52] U.S. Cl. ............... 210/333.01; 210/356; 210/351; 210/411; 210/488
[58] Field of Search ................ 210/332, 356, 350-352, 210/354, 411, 483, 488, 489, 333.01

[56] References Cited

U.S. PATENT DOCUMENTS

| | | | |
|---|---|---|---|
| 4,271,018 | 6/1981 | Drori | 210/354 X |
| 4,552,655 | 11/1985 | Mranot | 210/488 X |
| 4,624,785 | 11/1986 | Drori | 210/488 X |
| 4,655,910 | 4/1987 | Tabor | 210/254 X |

Primary Examiner—Charles Hart
Attorney, Agent, or Firm—Benjamin J. Barish

[57] ABSTRACT

A fluid filtering device, comprises: a housing having a fluid inlet and a fluid outlet for the fluid to be filtered, and a flushing outlet for the dirt separated from the fluid; a supporting core extending longitudinally within the housing; a plurality of annular filter discs supported as a stack on the supporting core; and a pressure plate supported at one end of the stack, and movable in one longitudinal direction to tighten the stack by pressing the discs together, or in the opposite direction to loosen the stack. A cleaning nozzle is supported within the housing for movement along the length of the stack and has its axis oriented to apply a flushing fluid eccentrically to the discs, when the stack is loosened, to rotate the disc on the supporting core and thereby to flush the dirt particles therefrom through the flushing outlet.

20 Claims, 9 Drawing Sheets

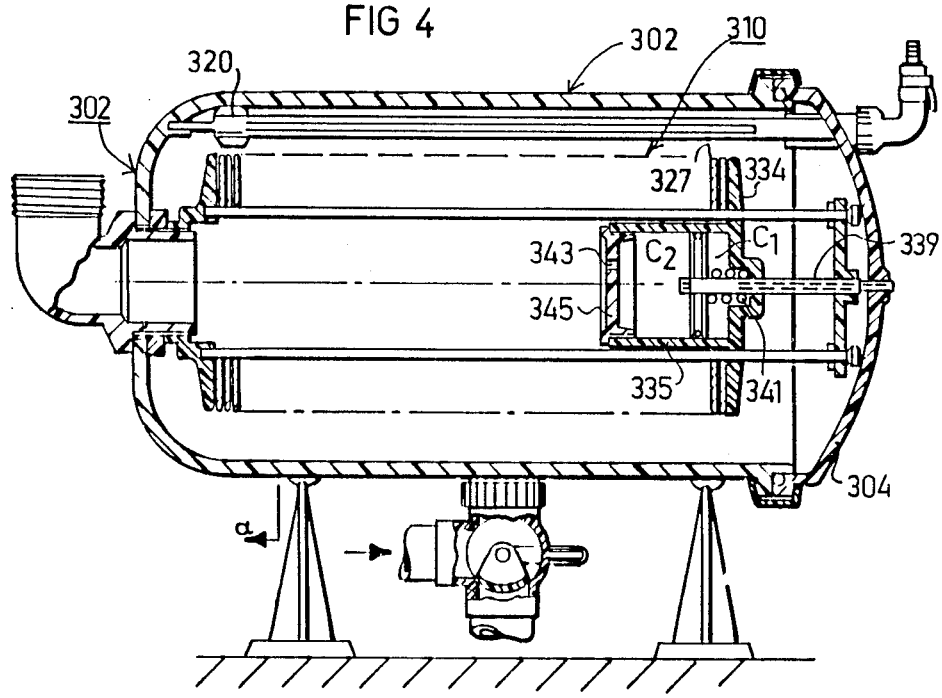
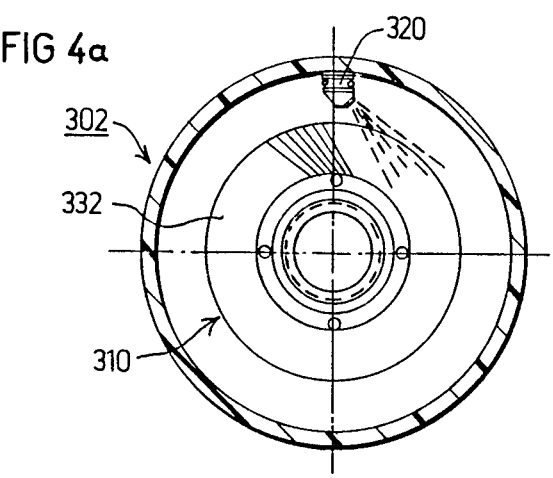

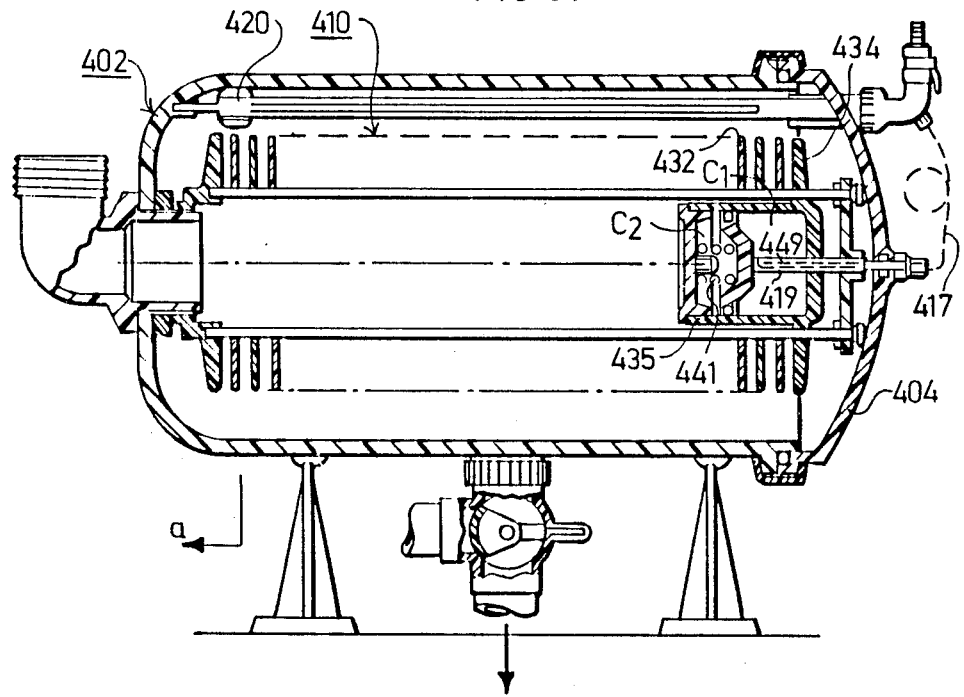

SEMI-AUTOMATIC FLUID FILTER

BACKGROUND OF THE INVENTION

The present invention relates to fluid filters such as are widely used in agriculture and in industry for separating dirt particles from water or other fluids. The invention is particularly applicable to a fluid filtering device which may be conveniently cleaned without opening the filter housing.

Many constructions of fluid filtering devices have been proposed to facilitate their cleaning. The common type of filtering device includes a simple manual cleaning arrangement which requires the filter housing to be opened in order to provide access to the filter body, for example filter discs, for cleaning them. Another type of filter includes an automatic cleaning arrangement which, upon sensing an undue build-up of dirt on the filter body, automatically effects a cleaning operation for cleaning the filter. The latter type filter does not require opening the filter housing, but is generally of considerably more complicated construction than the manually-cleanable filter, and is therefore considerably more expensive to produce and also to maintain.

An object of the present invention is to provide a fluid filtering device which does not require opening the housing in order to permit cleaning the filter body, but which is of substantially simpler construction than the automatic filter, and is therefore considerably less expensive to produce and to maintain. The new filter may be called a "semi-automatic cleanable" filter, to be distinguished from the "manually-cleanable" and the "automatically-cleanable" types mentioned above.

BRIEF SUMMARY OF THE INVENTION

According to the present invention, there in provided a fluid filtering device comprising a housing having fluid inlet and a fluid outlet for the fluid to be filtered, and a flushing outlet for the dirt separated from the fluid; a supporting core extending longitudinally within the housing; a plurality of annular filter discs supported as a stack on the supporting core; a pressure plate supported at one end of the stack, and movable in one longitudinal direction to tighten the stack by pressing the discs together, or in the opposite direction to loosen the stack; and a cleaning nozzle supported within the housing for movement along the length of the stack and having its axis oriented to apply a flushing fluid eccentrically to the discs, when the stack is loosened, to rotate the discs on the supporting core and thereby to flush the dirt particles therefrom through the flushing outlet.

According to a further preferred feature of the invention, the cleaning nozzle is supported within the housing by guiding members which permit longitudinal movement of the nozzle along the length of the stack while maintaining the nozzle oriented eccentrically to the stack during such longitudinal movements.

As will be more apparent from the description below, the invention permits fluid filtering devices to be constructed and maintained at substantially lower cost than the automatically-cleanable filtering devices mentioned above, but still enables cleaning the filter without opening the filter housing or disconnecting the filter from the supply line.

Further features and advantages of the invention will be apparent from the description below.

BRIEF DESCRIPTION OF THE DRAWINGS

The invention is herein described, by way of example only, with reference to the accompanying drawings, wherein:

FIG. 1c is an enlarged fragmentary view of FIG. 1a;

FIGS. 4, 4a and 4b are views corresponding to FIGS. 1, 1a and 1b, but illustrating a fourth filtering device constructed in accordance with the invention; and FIGS. 5, 5a and 5b are views corresponding to FIGS. 1, 1a and 1b, but illustrating a fifth filtering device constructed in accordance with the present invention.

DESCRIPTION OF A PREFERRED EMBODIMENT

Figure 1:
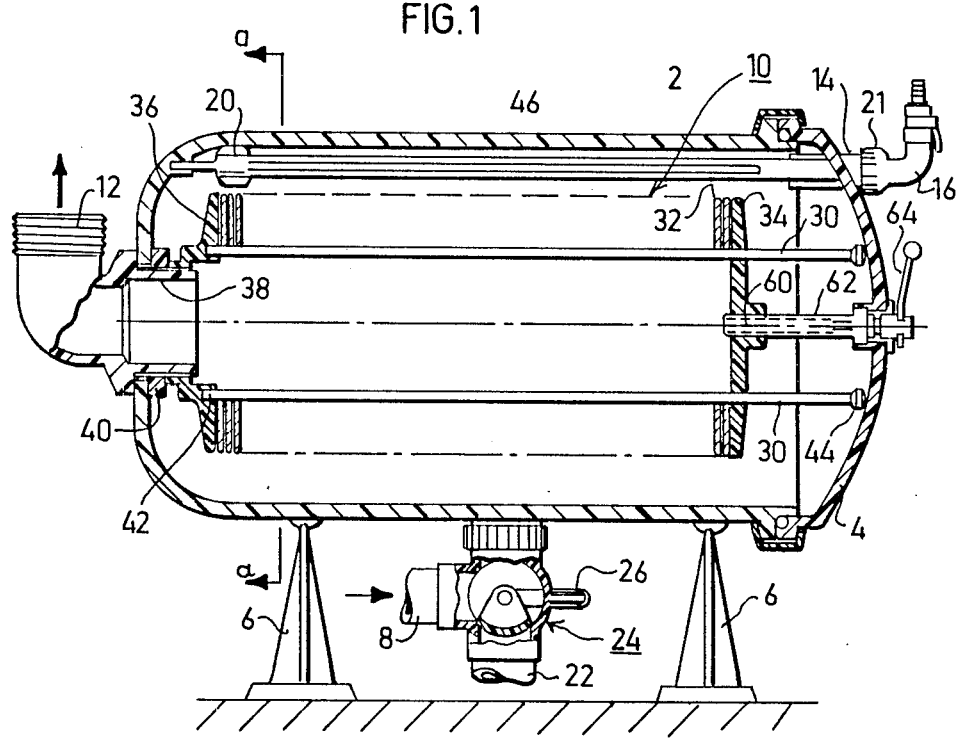
FIG. 1 is a longitudinal sectional view illustrating one form of filtering device constructed in accordance with the invention.

The filtering device illustrated in FIG. 1 comprises a housing 2 closed at one end by a cover plate 4 and supported by legs 6. The fluid, such as water, to be filtered is introduced into housing 2 via an inlet 8, and is filtered by a filter body, generally designated 10, before exiting from the housing via outlet 12. Housing 2 further includes an inlet 14 for receiving a pipe 16 for a flushing liquid which is fed to a cleaning nozzle 20 to flush the dirt particles accumulated on the filter body 10 to a flushing outlet or drain 22. Cleaning nozzle 20, by loosening collar 21, is movable along the complete length of the filter body during a cleaning operation so as to throughly flush it with the flushing liquid introduced via pipe 16.

Drain 22, through which the separated dirt particles are flushed out of the filter housing 2, is a part of the same fitting 24 containing the water inlet to the housing. This fitting includes a manually controllable valve 26 to connect the housing either to inlet 8 or to drain 24.

Filter body 10 includes a supporting core, in the form of a circular array of rods extending longitudinally within housing 2, supporting a plurality of annular filter discs 32 in the form of a sack. Supporting core 30 further supports pressure plate 34 at one end of the sack which pressure plate is movable in one longitudinal direction (leftwardly, FIG. 1) to tighten the stack by pressing the filter discs 32 together, or in the opposite direction (rightwardly, FIG. 1) to loosen the sack when it is desired to clean the filter discs.

Filter body 10 further includes another end plate 36 at the opposite end of the stack of discs 32. End plate 36 is slidably received on a sleeve 38 integrally formed with the outlet fitting 12, which fitting is secured within an opening in housing 2 by a nut 40.

Figure 1A:
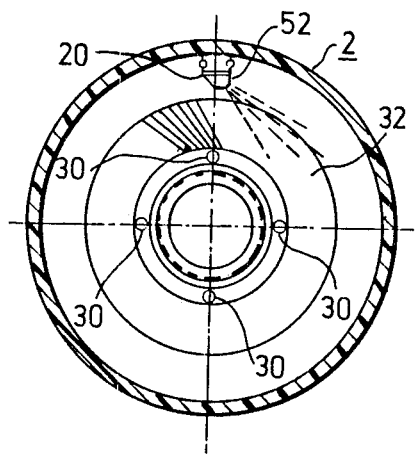
FIG. 1a is a transverse sectional view along lines a—a.

End plate 36 is formed with a circular array of sockets 42, one for each of the rods 30 supporting the stack of filter discs 32. As shown in FIG. 1a, there are four such rods 30, and therefore end plate 36 would be formed with four sockets 42. The opposite ends of rods 30 are received within sockets 44 formed in the cover plate 4.

Figure 1C:
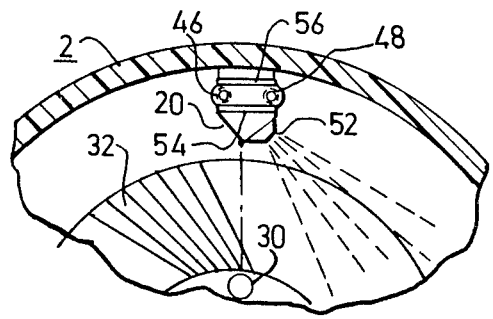

Cleaning nozzle 20 is guided by a pair of further rods 46, 48 (FIG. 1c) supported within housing 2 adjacent to the outer face of the stack of filter discs 32. Nozzle 20 is provided with a nozzle orifice 52 (FIG. 1a) whose axis is oriented eccentrically to the discs 32 of the filter body 10. Nozzle 20 is further formed with a pair of annular ribs 54, 56 which receive between them the two spaced rods 46, 48. Thus, rods 46, 48 serve as guide rods which permit longitudinal movement of the nozzle 20 along the length of the stack of discs 32 while maintaining the axis of nozzle orifice 52 oriented eccentrically, preferably tangentially, to the stack during such longitudinal movements.

Figure 1B:
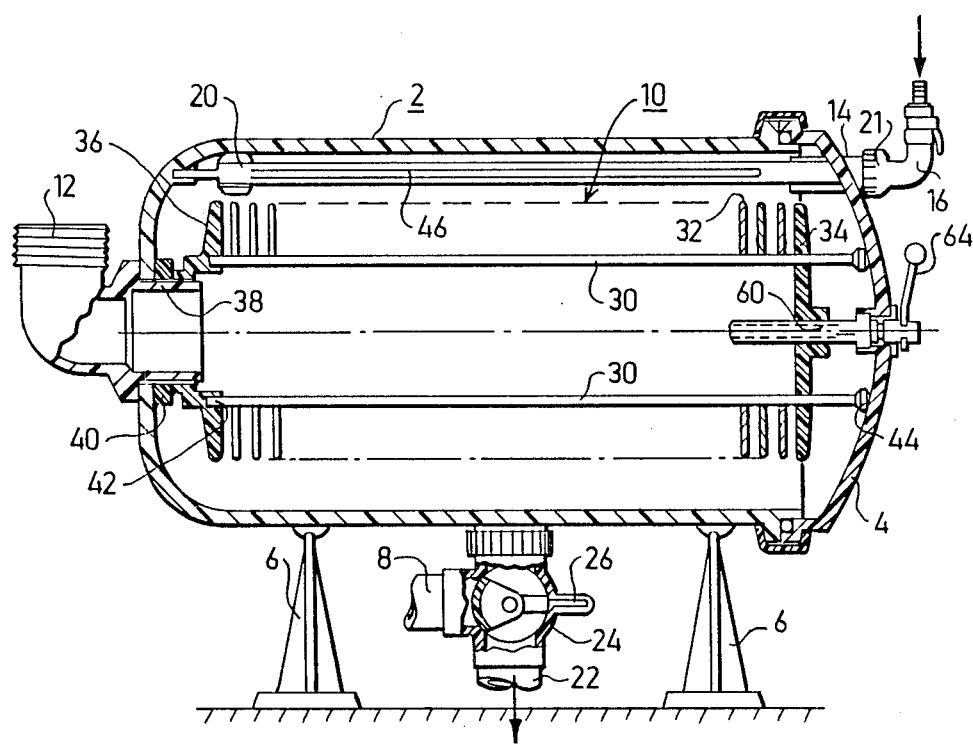
FIG. 1b is a view similar to that of FIG. 1 but illustrating the parts in their positions for cleaning the filter.

As indicated earlier, pressure plate 34 of the filter body 10 is movable to a stack-tightening position (FIG. 1) or to a stack-loosening position (FIG. 1b). For this purpose, pressure plate 34 is formed with four openings for receiving rods 30 supporting the stack of filter discs 32, which rods guide the movement of the pressure plate to its stack-tightening position or to its stack-loosening position. For moving the pressure plate, it is provided with an internally-threaded opening 60 receiving an externally-threaded pin 62 passing through an opening centrally of the housing cover plate 4 and coupled to a handle 64 externally of the cover plate. Thus, rotating handle 64 in one direction moves pressure plate 34 towards end plate 36 at the opposite end of the stack of discs 32 to tighten the stack, while rotating handle 64 in the opposite direction, moves pressure plate 34 in the opposite direction to loosen the stack of discs.

The filter illustrated in FIG. 1 is used in the following manner: During the normal filtering operation of the filter, pressure plate 34 is moved by rotation of handle 64 to the stack-tightening position illustrated in FIG. 1, namely firmly pressing the filter discs 32 together. Valve 26 is manually moved to connect the water inlet 8 to the filter housing, and to disconnect therefrom the drain 22. Thus, the water inletted via inlet 8 passes into the interior of filter housing 2, throught the stack of filter discs 32 and spaces between the supporting rods 30, and out through housing outlet 12. The dirt separated from the water will accumulate on the outer faces of the stack of discs 32 and also in the spaces between the discs.

Whenever it is desired to clean the filter, valve 26 is manually moved so as to disconnect the interior of the housing 2 from the water inlet 8 and to connect it to the drain 22. In addition, handle 64 is rotated so as to move pressure plate 34 from the stack-tightening position illustrated in FIG. 1, to the stack-loosening position illustrated in FIG. 1b. Further, collar 21 is loosened to permit pipe 16 to move within the flushing inlet 14. Pipe 16 is then connected to a source of flushing liquid, which may be the same water supplied to inlet 8 for filtering purposes, end the pipe is manually moved so as to move cleaning nozzle 20 back and forth, as many times as desired, over the outer face of the loosened discs 32. During this manual movement of the cleaning nozzle 20, its outlet orifice 52 is maintained, by guide rods 46, 48, such that its axis is eccentric, preferably tangential, to the outer faces of the filter discs 32. The discs are therefore rotated by the pressure of the water from nozzle orifice 52 and are throughly rinsed of the dirt particles which accumulated thereon during the operation of the filter.

After the filter discs have thus been cleaned, nozzle 20 is returned to its home position illustrated in FIG. 1; collar 18 is tightened to lock it in this position; handle 64 is rotated to return pressure plate 34 to its stack-tightening position (FIG. 1); and valve 26 is operated so as to disconnect the interior of housing 2 from drain 22, and to reconnect it to the water inlet 8.

It will thus be seen that the filter device illustrated in FIGS. 1, 1a, 1b and 1c may be easily cleaned without opening the filter housing 1 or detaching it from the water supply line.

Figure 2:
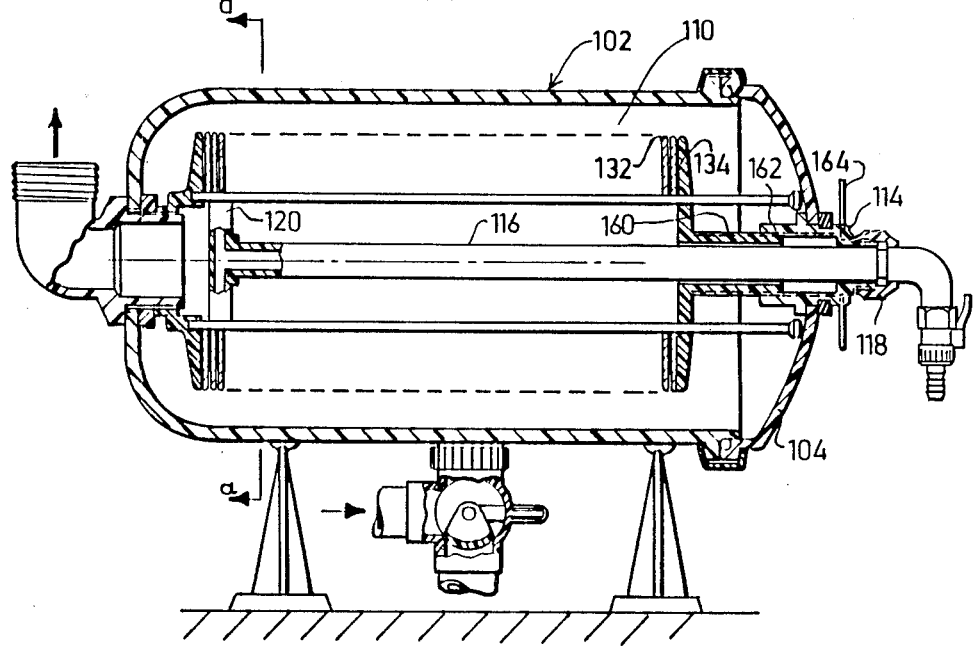
FIGS. 2, 2a and 2b are views corresponding to FIGS. 1, 1a, and 1b but illustrating a second filtering device constructed in accordance with the invention.
Figure 2A:
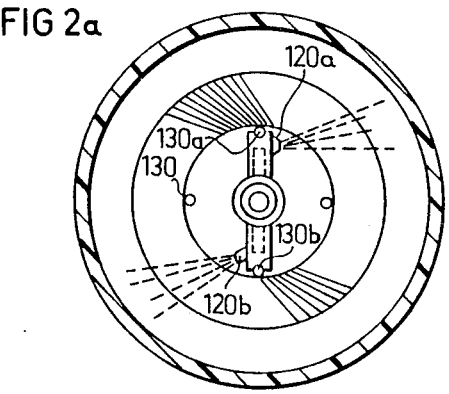
Figure 2B:
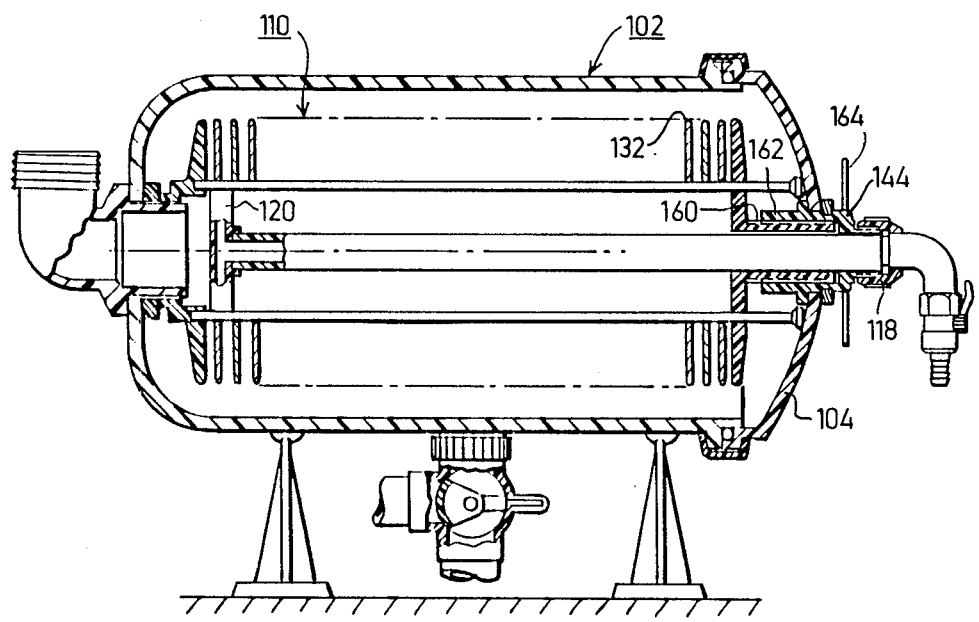

FIGS. 2, 2a and 2b illustrate another construction wherein the cleaning nozzle is carried by a head, generally designated 120, movable along the inner face of the stack of discs 132 constituting the filter body 110. Thus, as shown in FIG. 2a, head 120 is formed with two cleaning nozzles 120a, 120b at the opposite sides of the cleaning head, which nozzles are formed with orifices for applying two jets of cleaning liquid eccentrically to the filter discs 132 of the stack, thereby rotating the discs during the cleaning operation.

As shown in FIGS. 2, 2a and 2b, the inlet 114 for the cleaning liquid pipe 116 is formed centrally through the housing cover plate 104, and may be fixed or released for longitudinal movement by collar 118. In addition, pressure plate 134, which moved in order to tighten or loosen the stack of filter discs 132, is integrally formed with a central stem 160 which is hollow to accomodate pipe 116. Stem 160 is externally threaded and receives an internally threaded bushing or sleeve 162 passing through the central opening in the housing and wall 104 and carrying a rotary handle 164 externally of the housing.

It will thus be seen that rotation of handle 164 in one direction moves pressure plate 134 to the stack-tightening position illustrated in FIG. 2 for a normal filter operation, and rotating the handle in opposite direction moves the pressure plate to the stack-loosening position, illustrated in FIG. 2b, to permit cleaning of the filter by a cleaning liquid applied to the nozzles 120a, 120b of the cleaning head 120. For performing the cleaning operation, collar 118 is loosened, and pipe 116 is manually moved so as to move the cleaning nozzles 120a, 120b across the inner faces of the stack of filter discs 132. As shown in FIG. 2a, head 120 is provided with recesses for receiving two of the rods 130a, 130b of the four rods 130 which support the stack of discs 132. Thus, rods 130a, 130b serve as the guiding rods for guiding the longitudinal movement of the cleaning nozzle head 120 while maintaining the cleaning nozzles oriented eccentrically to the filter discs 132 of the stack, so as to rotate the discs during this cleaning operation and to thereby throughly flush them of dirt particles.

Figure 3:
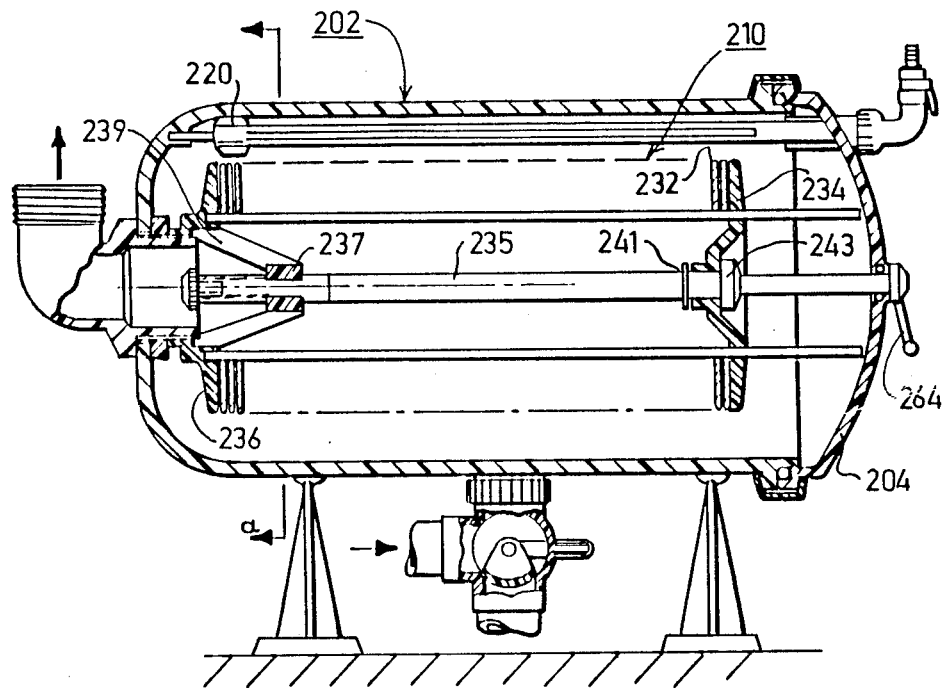
FIGS. 3 and 3a are views corresponding to FIGS. 1 and 1a but illustrating a third filtering device constructed in accordance with the invention.

FIG. 3 illustrates a filtering device similar to that of FIG. 1 except that it uses a slightly different arrangement for moving the pressure plate, therein designated 234, to either its stack-tightening position (FIG. 3) during the normal filtering operation, or to its stack-loosening position (not shown) during a cleaning operation. In the FIG. 3 arrangement, the movable pressure plate 234 is carried on a stem 235 which is externally threaded at its opposite end and is threaddedly received within a nut 237 fixed to end plate 236 at the opposite end of the filter body 210 by a plurality of spaced vanes 239. The movable pressure plate 234 is formed with a central opening receiving stem 235, and the latter stem is formed with a pair of annular ribs 241, 243 effective to move the pressure plate with the stem as the stem is threaded into or out of nut 237. Stem 235 extends through an opening formed centrally of the housing cover plate 204 and carries an external handle 264 to permit rotation of stem 235 externally of the filter housing 202. It will thus be seen that when handle 264 is rotated in one direction, stem 235 is threaded further into nut 237 so as to move pressure plate 234 to its stack-tightening position as illustrated in FIG. 3, and when the handle 264 is rotated in the opposite direction, stem 235 is threaded in the opposite direction with respect to nut 237 so as to move pressuer plate 234 in the stack-loosening direction.

Figure 3A:
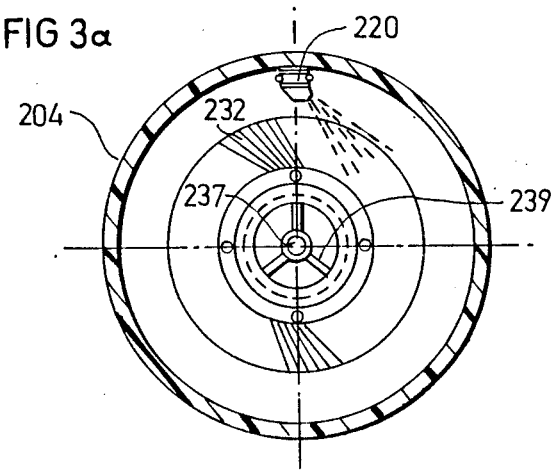

As shown in FIG. 3a, the cleaning nozzle 220 is disposed to move longitudinally across the outer faces of the stack of discs 132 of the filter body 110 in the same manner as described above with respect to FIG. 1.

Figure 4B:
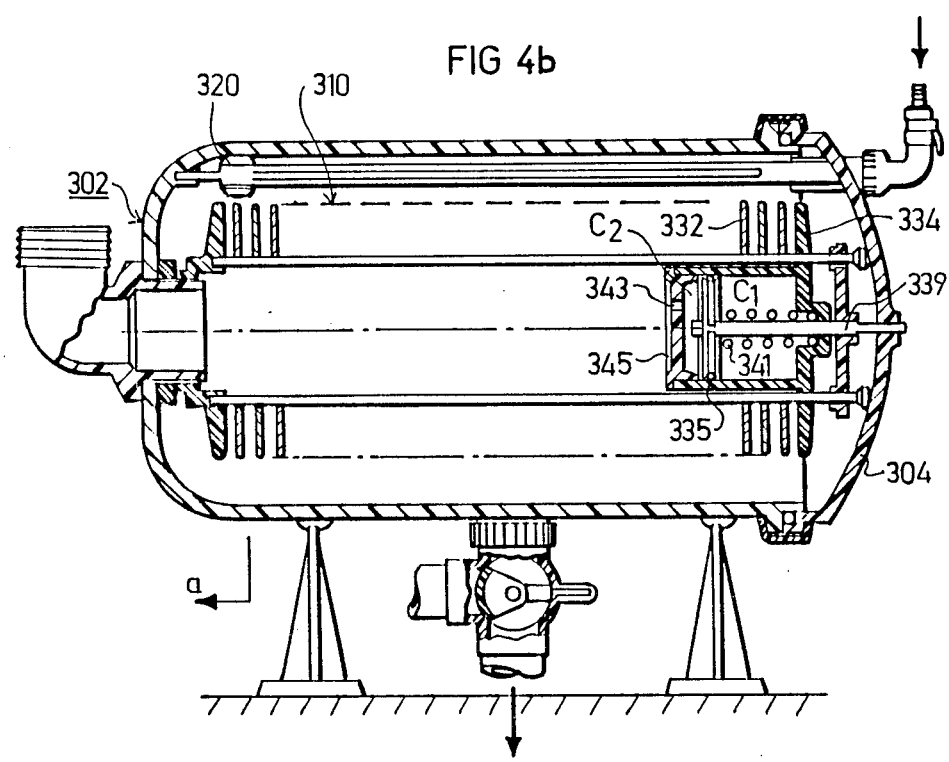

FIG. 4 illustrates a further variation wherein the pressure plate, therein designated 334, is moved either to its stack-tightening position (FIG. 4), or to its stack-loosening position (FIG. 4b), by a piston and cylinder assembly.

Thus, as shown in FIG. 4, pressure plate 334 is integrally formed at one end of a cylinder 335, which cooperates with a piston 337 fixed by a stem 339 to the cover plate 304 of the filter housing 302. Piston 337 defines, with cylinder 335, a first chamber $C_1$ on one side of the piston, and a second chambe $C_2$ on the opposite side of the piston. Chamber $C_1$ includes a spring 341 urging cylinder 335, and thereby pressure plate 334, rightwardly in FIG. 4, i.e., to its stack-loosening position. Chamber $C_2$ is vented, by an opening 343, to the interior of the filter housing 302, at the downstream side of the filter discs 332 constituting the filter body 310.

It will thus be seen that during a normal filtering operation, the pressure of the water introduced into the filter housing 302 via inlet 308 will be applied via opening 343 to chamber $C_2$, thereby moving cylinder 335 leftwardly, such that pressure plate 334 tightens the stack of filter discs 332. This is the position of the parts during a normal filtering operation. When it is desired to clean the filter, inlet valve 326 is manually moved to disconnect the interior of housing 302 from the water inlet 308 and to connect it to the atmoshphere via the drain port 322. The pressure within the filter housing 302 and within chamber $C_2$ is thus substantially lowered, towards atmospheric pressure, whereupon spring 341 within chamber $C_2$ moves cylinder 335, and with it pressure plate 334, in the rightward direction of FIG. 4, namely to loosen the stack of filter discs 332, as shown in FIG. 4b.

The arrangement of the cleaning nozzle 320 in the construction illustrated in FIGS. 4, 4a and 4b, is the same, and operates in the same manner, as described above with respect to FIG. 1.

Figure 5:
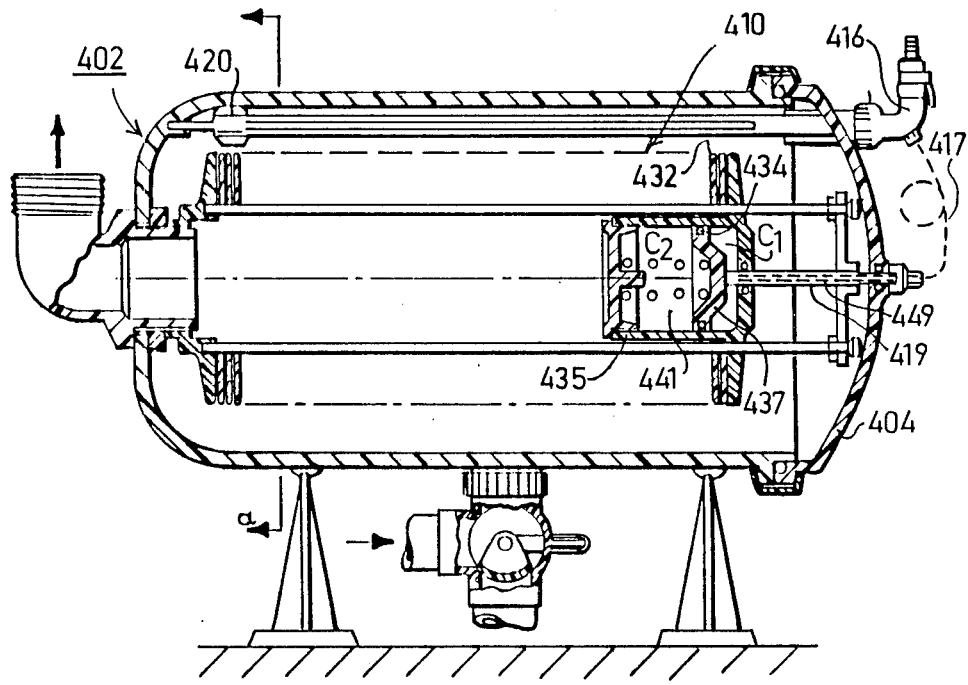

FIG. 5 illustrates a still further arrangement similar to that of FIG. 4 for moving the pressure plate, therein designated 434, to either its stack-tightening position (FIG. 5) or to its stack-loosening position (FIG. 5b). Thus, as in FIG. 4, pressure plate 434 is carried at one end of a cylinder 435 which receives a piston 437 dividing the interior of the cylinder into a first chamber $C_1$ and a second chamber $C_2$ on the opposite side of the piston. In this case, however, the spring 441 is disposed within chamber $C_2$ so as to normally urge the pressure plate 434 to its stack-tightening position. Chamber $C_2$ normally communicates with the interior of the filter housing 402, at the upstream side of the filter discs 432, by a passageway 443 extending through the cylinder. Chamber $C_1$ on the opposite side of piston 437 communicates with the flushing liquid pipe 416 via a line 417 and a passageway 419 through stem 449 fixing the piston 447 to end plate 404 of the filter housing 402.

Figure 5A:
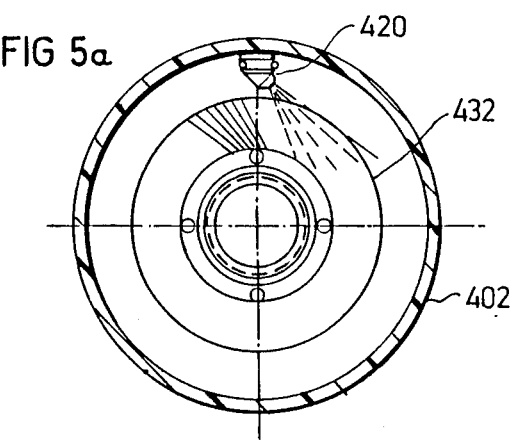

It will thus be seen that, during the normal filter operation of the filter illustrated in FIGS. 5, 5a, 5b, the pressure of the liquid being filtered is applied to chamber $C_2$ via passageway 443, so as to aid the spring 441 to move cylinder 435 leftwardy, thereby to move pressure plate 434 to its stack-tightening position as illustrated in FIG. 5. However, when a cleaning operation is to be performed, valve 426 is moved to disconnect the interior of housing 402 from inlet 408, and to connect it to the atmosphere via drain 422, so that the pressure within chamber $C_2$ drops substantially to atmospheric pressure. At the same time, the pressure of the flushing liquid supplied via pipe 416 is applied via line 417 and passageway 419 to chamber $C_1$, to overcome the force of spring 441 and to move cylinder 435, and thereby pressure plate 434 in the rightward direction as illustrated in FIG. 5b, to loosen the stack of discs 432, and thereby to permit the stack to be thoroughly flushed by the liquid applied to the cleaning nozzle 420 via pipe 416. The cleaning nozzle arrangement illustrated in FIGS. 5, 5a and 5b is also similar to that discribed above with respect to FIGS. 1, 1a, 1b and 1c.

While the invention has been described with respect to a number of preferred embodiments, it will be appreciated that the these are set forth merely for purposes of example, and that further variations, modifications and applications of the invention may be made.

What is claimed is:

1. A fluid filtering device, comprising: a housing having a fluid inlet and a fluid outlet for the fluid to be filtered, and a flushing outlet for the dirt separated from the fluid; a supporting core extending longitudinally within said housing; a plurality of annular filter discs supported as a stack on said supporting core; a pressure plate supported at one end of said stack, and movable in one longitudinal direction to tighten the stack by pressing the discs together, or in the opposite direction to loosen the stack; and a cleaning nozzle supported within the housing for movement along the length of the stack and having its axis oriented to apply a flushing fluid eccentrically to the discs, when the stack is loosened, to rotate the disc on the supporting core and thereby to flush the dirt particles therefrom through the flushing outlet.

2. The device according to claim 1, wherein said cleaning nozzle is supported within said housing by guiding members which permit longitudinal movemment of the nozzle along the length of the stack while maintaining the nozzle axis oriented eccentrically to the stack during such longitudinal movements.

3. The device according to claim 2, wherein said guiding members comprise a pair of rods extending in parallel relationship longitudinally of the housing.

4. The device according to claim 2, wherein said supporting core includes a circular array of rods extending in parallel spaced relationship longitudinally of the housing.

5. The device according to claim 4, wherein said cleaning nozzle is movable over the outer face of the stack along a pair of further rods extending in parallel space relationship longitudinally of the housing.

6. The device according to claim 4, wherein said cleaning nozzle is movable over the inner face of the stack along at least two of the rods of said circular array.

7. The device according to claim 6, wherein said cleaning nozzle is carried by a head movable along the inner face of the stack, which head carries said cleaning nozzle at one side thereof and second cleaning nozzle at the opposite side thereof.

8. The device according to claim 1, wherein said cleaning nozzle is carried by a pipe extending through an end wall of the filter housing so as to permit manual movement of the cleaning nozzle externally of the housing.

9. The device according to claim 1, wherein said pressure plate is slidably carried at one end of said supporting core and is coupled to a handle externally of the housing by a threaded member which is rotated by said handle to move the pressure plate to its stack-tightening position or to its stack-loosening position.

10. The device according to claim 9, wherein said threaded member is an externally threaded pin received in a threaded opening formed centrally in said pressure plate.

11. The device according to claim 9, wherein said threaded member is an internally threaded sleeve received around an externally threaded stem carried centrally by said pressure plate.

12. The device according to claim 9, wherein said threaded member is a stem rotatably carrying said pressure plate at said one end of said stack and threaded at the opposite end with respect to a threaded socket carried by said housing at the opposite end of the stack.

13. The device according to claim 1, further including a piston and cylinder assemby, one of which is fixed to the housing and the other of which carries said pressure plate to move same to its stack-tightening or stack-loosening position.

14. The device according to claim 13, wherein said piston and cylinder assembly defines a first and a second chamber on the opposite sides of said piston, said second chamber including a spring urging the pressure plate to its stack-loosening position, said first chamber communicating with the pressure within the housing such that when the housing is pressurized by the fluid therein during a normal filtering operation, the pressure within the housing is effective to overcome the force of the spring and to move the pressure plate to its stack-tightening position during the normal filtering operation.

15. The device according the claim 13, wherein said piston and cylinder assembly define a first and a second chamber on the opposite sides of said piston, said second chamber including a spring urging the pressure plate to its stack-tightening position, said second chamber communicating with the pressure within the housing which pressure adds to the force of the spring to move the pressure plate to its stack-tightening position during a normal filtering operation, said first chamber communicating with the pressure of the fluid applied to the cleaning nozzle such that the latter pressure, when connected to the cleaning nozzle and when the pressure within the housing is released, overcomes the force of the spring to move the pressure plate to its stack-loosening position.

16. A fluid filtering device, comprising: a housing having a fluid inlet and a fluid outlet for the fluid to be filtered, and a flushing outlet for the dirt separated from the fluid; a supporting core extending longitudinally within said housing; a plurality of annular filter discs supported as a stack on said supporting core; a pressure plate supported at one end of said stack, and movable in one longitudinal direction to tighten the stack by pressing the discs together, or in the opposite direction to loosen the stack; and a cleaning nozzle supported within the housing for movement along the length of the stack and having its axis oriented to apply a flushing fluid eccentrically to the discs, when the stack is loosened, to rotate the disc on the supporting core and thereby to flush the dirt particles therefrom through the flushing outlet; said cleaning nozzle being carried by a pipe extending through an end wall of the filter housing so as to permit manual movement of the cleaning nozzle externally of the housing.

17. The device according to claim 16, wherein said cleaning nozzle is supported within said housing by guiding members which permit longitudinal movemment of the nozzle along the length of the stack while maintaining the nozzle axis oriented eccentrically to the stack during such longitudinal movements.

18. The device according to claim 17, wherein said pressure plate is slidably carried at one end of said supporting core and is coupled to a handle externally of the housing by a threaded member which is rotated by said handle to move the pressure plate to its stack-tightening position or to its stack-loosening position.

19. A fluid filtering device, comprising: a housing having a fluid inlet and a fluid outlet for the fluid to be filtered, and a flushing outlet for the dirt separated from the fluid; a supporting core extending longitudinally within said housing; a plurality of annular filter discs supported as a stack on said supporting core; a pressure plate supported at one end of said stack, and movable in one longitudinal direction to tighten the stack by pressing the discs together, or in the opposite direction to loosen the stack, said pressure plate being slidably carried at one end of said supporting core and being coupled to a handle externally of the housing by a threaded member which is rotated by said handle to move the pressure plate to its stack-tightening position or to its stack-loosening position; and a cleaning nozzle supported within the housing for movement along the length of the stack and having its axis oriented to apply a flushing fluid eccentrically to the discs, when the stack is loosened, to rotate the disc on the supporting core and thereby to flush the dirt particles therefrom through the flushing outlet.

20. The device according to claim 19, wherein said cleaning nozzle is supported within said housing by guiding members which permit longitudinal movemment of the nozzle along the length of the stack while maintaining the nozzle axis oriented eccentrically to the stack during such longitudinal movements.

* * * * *